July 26, 1966 W. A. WEBB 3,262,214
COUNTERCURRENT DRYING PROCESS AND APPARATUS
Filed July 26, 1965 6 Sheets-Sheet 1

FIG-1

INVENTOR:-
WELLS A. WEBB
BY
ATTORNEYS

United States Patent Office 3,262,214
Patented July 26, 1966

3,262,214
COUNTERCURRENT DRYING PROCESS
AND APPARATUS
Wells A. Webb, 609 Via Vista Drive,
Redlands, Calif. 92373
Filed July 26, 1965, Ser. No. 477,354
6 Claims. (Cl. 34—10)

This application is a continuation-in-part of my application Ser. No. 97,852, filed March 23, 1961, now abandoned.

This invention relates to a process and apparatus for continuous dehydration of relatively finely divided materials in large quantities.

An object of my invention is to provide a dehydrating apparatus having automatic means for loading and distributing the material to be processed.

Another object of my invention is the provision of a mobile apparatus capable of handling and drying large volumes of agricultural products such as vegetables, fruits and the like in the field immediately following their harvesting.

A further object of my invention is to provide an efficient dehydrating apparatus and method which utilizes heated, pressurized air to assist in supporting the material during drying to prevent compacting and adhesion.

A still further object of my invention is a dehydrating apparatus providing for the passage of heated air through a thick layer of produce which is contained against escape by a continuously movable grid.

Another object of my invention is to provide a drying method wherein incoming wet material is spread in successive, aerodynamically supported horizontal layers which move downwardly as drying proceeds and are ultimately discharged as dry material from the bottom of the stratified bed thus formed.

Still another object of my invention is to provide a drying method wherein the whole mass of material is passed layer after layer horizontally in a regular downward course through successive zones of warmer air so that the layers are not mixed but lie one above the other just as they had been added by feeder action, until the oldest layer is the lowest one and is the layer that is most dry and is subject to discharge action.

A further object of my invention includes supporting a substantial part of the weight of a descending stratified bed of wet material on rising air preventing the material from sticking together, maintaining the material porous permitting upward flow of the dehydrating hot air, which passes through and between the particles of the bed.

A still further object includes preventing sticky fruits like cantaloupes from adhering while drying in the sliced condition, the upward blast of heated air serving to keep the particles from pressing hard (adhering) although they touch lightly and maintain their stratified layers while descending counter current to the rising air.

Another object includes a method wherein a drying bed is started on a raised grid that receives a thin layer of wet material when in the raised position, then adding successive layers of wet material to the top layer while the grid is being lowered to make room for the new additions, and blowing heated air up through the bed of increasing thickness.

A further object of the invention is to provide a dehydrating method wherein material being dehydrated is supported by upwardly moving air, and wherein the air supply to certain areas of the bed is periodically shut off, permitting material in the closed off areas to fall and to be removed from the dehydrating zone.

Heretofore it has not been possible to dry chopped alfalfa and similar leafy food particles that shrink when in large beds, and form cracks when dried in large, deep beds, for the heated air rushes up through the cracks and through the openings between the bed and the side walls of the apparatus, and is lost; not effective in drying.

An object is to keep the cracks in the bed filled with dry, leafy, lightweight, relatively large size particles that are aerodynamically active and float in the hot air and are carried upward in the cracks and are retained on the top screen, thereby stopping excessive uprush of air.

It should be understood that the present invention does not relate to a fluidized process, but rather one wherein a relatively dense bed of material moves downwardly through a chamber as the material is dried without relative movement or mixing of the particles. The material is spread in successive layers on the top of the bed and remains stratified as it moves downwardly through the chamber.

Further, there is a temperature gradient throughout the bed so that as one goes up through the bed, the temperature decreases, so that at the top of the bed the air temperature is substantially that of the incoming material, i.e. only slightly above ambient, resulting in high thermal efficiency.

Still another object of my invention is the provision of a produce dehydrating apparatus having a material supply conveyor which cooperates with a reciprocating distribution and spread mechanism to facilitate the distribution of large volumes of moist material.

An additional object of the invention is to provide a mobile apparatus having automatic means for loading and distributing moist material uniformly for dehydration and subsequent removal and discharge of the dried material from the apparatus for packing.

A still further object of my invention is to provide a dehydrating method and apparatus capable of handling large quantities of moist produce at least partially supported by the upward flow of heated, pressurized air during the drying process, having a grid-like cover to prevent particles from escaping and an oscillating grate mechanism at the bottom for releasing regulated amounts of dried material to a discharge trough.

A most common method of dehydrating moist objects such as freshly harvested vegetables, fruits and other agricultural produce is to spread them thinly on trays which are then subjected to heated air for the necessary time to remove their excess moisture. This process requires excessive manual handling, a large space, and normally a semi-permanent drying plant, often in such a location remote from the growing areas. It is not uncommon for large quantities of agricultural produce to spoil in the fields due to the lack of proper drying facilities in the immediate vicinity.

The apparatus of the present invention was developed to provide a mobile dehydrating assembly for easy transport either on a highway or railroad to the desired site of operations. The assembly is designed as a complete dehydrating plant having provisions for receiving, grading, automatic spreading and dehydrating of large volumes of produce in one continuous operation, including delivery of treated material to a shipping area.

The invention as illustrated in the accompanying drawings covers an assembly of mobile units which cooperate to provide on-the-spot dehydration of agricultural produce. The assembly comprises generally a dehydrating apparatus 10 (FIGURE 1), an air heater-compressor unit 11, a receiving, pre-processing and feeding assembly 12, a fuel supply tanker 13 and the necessary interconnecting material conveyors, elevators and supply facilities to permit operation of the assembled units and apparatus as a complete dehydrating plant. To this end the various units are mounted on wheels to facilitate their transportation to any desired location.

GENERAL OPERATION

Figure 1:
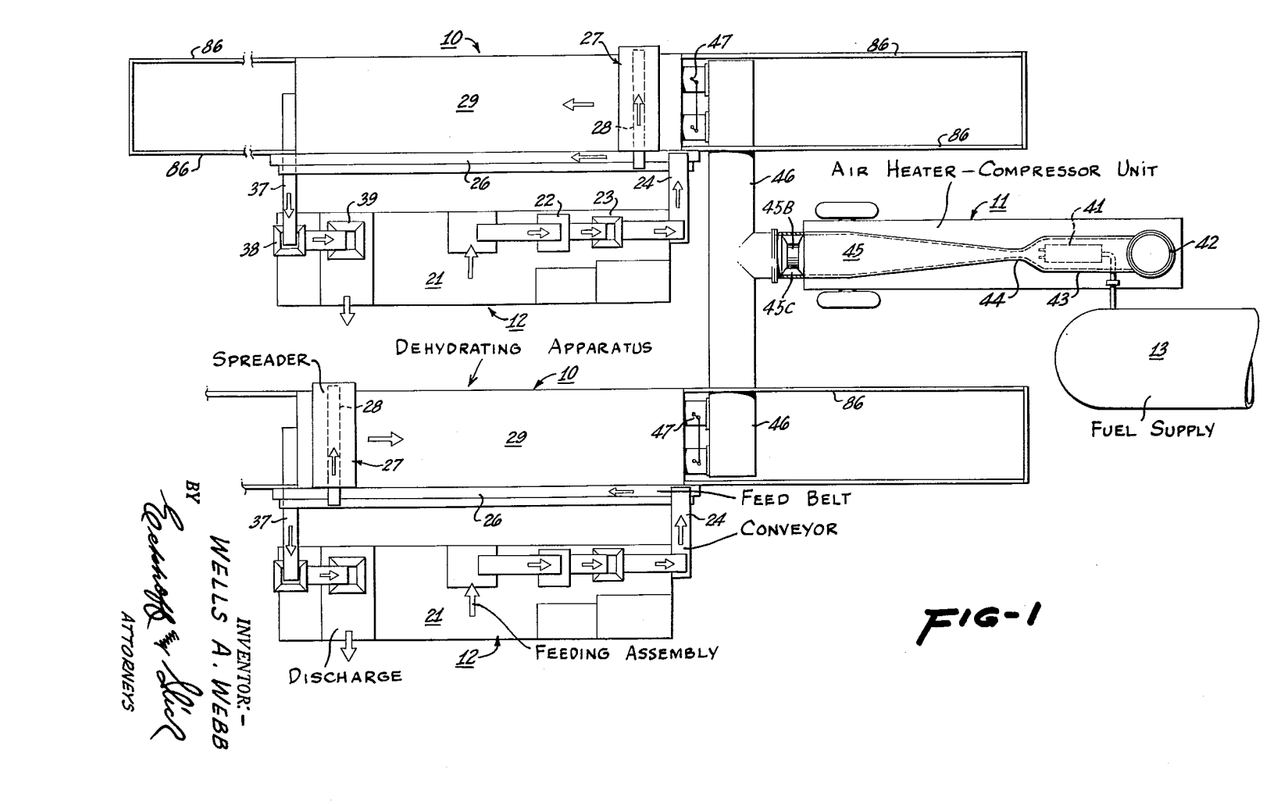
FIGURE 1 is a diagrammatic layout illustrating the general relationship of the cooperating elements of the dehydrator assembly.

The receiving assembly 12 incorporates a receiving, grading and shipping area generally indicated at 21, and may carry some pre-processing machines such as chopper 22, press 23 as well as peeling, cutting or washing devices as may be required. An elevating conveyor 24 is provided for lifting the raw material to the dehydrator apparatus 10 for treatment. The raw material is deposited on a horizontal conveyor 26 to be delivered to a reciprocating distribution mechanism 27, having a transverse spreader 28 for distributing the material evenly throughout a dehydrator compartment 29. A controlled supply of pressurized heated air from the heater-compressor is then forcibly blown upwardly from a plenum chamber through the moist material for drying purposes. A grid assembly 31 (FIGURE 2) overlies the top of compartment 29 to prevent the escape of material during this process.

As the dehydration of the material proceeds, the lowest portion receives the direct application of heat and the grate 32 is oscillated to allow this dried portion to fall through lengthwise troughs 33 onto conveyor 34 for transfer to a hopper 36. An elevator 37 lifts the material out of hopper 36 for delivery to a shipping area on unit 12. At this point a pelletizer 38 or packaging apparatus 39 may be utilized if required.

It should be noted that the preferred procedure is to start the dehydrating operation with the supporting grate in an elevated position, with the heated air initially passing through a relatively shallow bed of moist material. As the drying process continues, more material is added and the grate is gradually lowered until an optimum bed depth is attained for continuous handling of the incoming moist material and discharge of dried material. When there is no additional material being fed to the dehydrator, the grate is gradually raised until all material is dried and discharged.

HEATER-COMPRESSOR UNIT

The heated, pressurized air required for the dehydrating process may be supplied by a suitable unit 11 having the required power to provide a volume of air sufficient to aerate the material while permitting the lowest portion to be in effective contact with the oscillating grate 32. This requires that approximately 90%–95% of the material weight be supported by the upward force of heated air passed through the material being treated.

A gas turbine engine is well suited to supply the heated volume of air, and I have provided such an engine 41 in heater-compressor unit 11. One can use any heater-compressor desired so long as the required volume of drying gas is provided. For example, one can use a resonant burner to supply the required volume of drying gas. The apparatus will be described as adapted for use with a gas turbine but it is not limited in this respect.

Fuel for engine 41 is supplied from mobile tanker 13 and a vertical air inlet 42 provides for the entry of air for both combustion and mixing purposes. Gas turbine 41 is mounted in a housing 43 having a venturi throat 44, where air from inlet 42 is mixed with exhaust gases of the engine 41 to pass into expansion diffuser chamber 45 to provide the desired volume of heated air for dehydration. A manifold 46 directs the air flow to each separate dehydrating unit. Regulating valves are provided as at 47 for control of the flow of air to the dehydrating unit through plenum chamber 48.

DISTRIBUTION MECHANISM

The material to be dehydrated is carried along conveyor belt 26 to be distributed evenly over the entire area of the dehydrating compartment 29 by the reciprocating mechanism 27 and transverse spreader 28. The distributing mechanism 27 comprises a chassis 51 (FIGURE 4) supported on pairs of wheels 52 mounted on axles 53 and 54 journalled in bearings 56. Drive pulleys 57 are fixed to the extremity of axles 53 and 54 to receive power belts 58 driven by reversible motor 59. A pair of sprockets 61 are fixed to axle 53 adjacent bearing units 56 and a second pair of sprockets 62 are similarly fastened to axle 54. These sprockets mate with the parallel rods of flexible grid 31 to provide for driving traction and to act as guiding elements.

Figure 2:
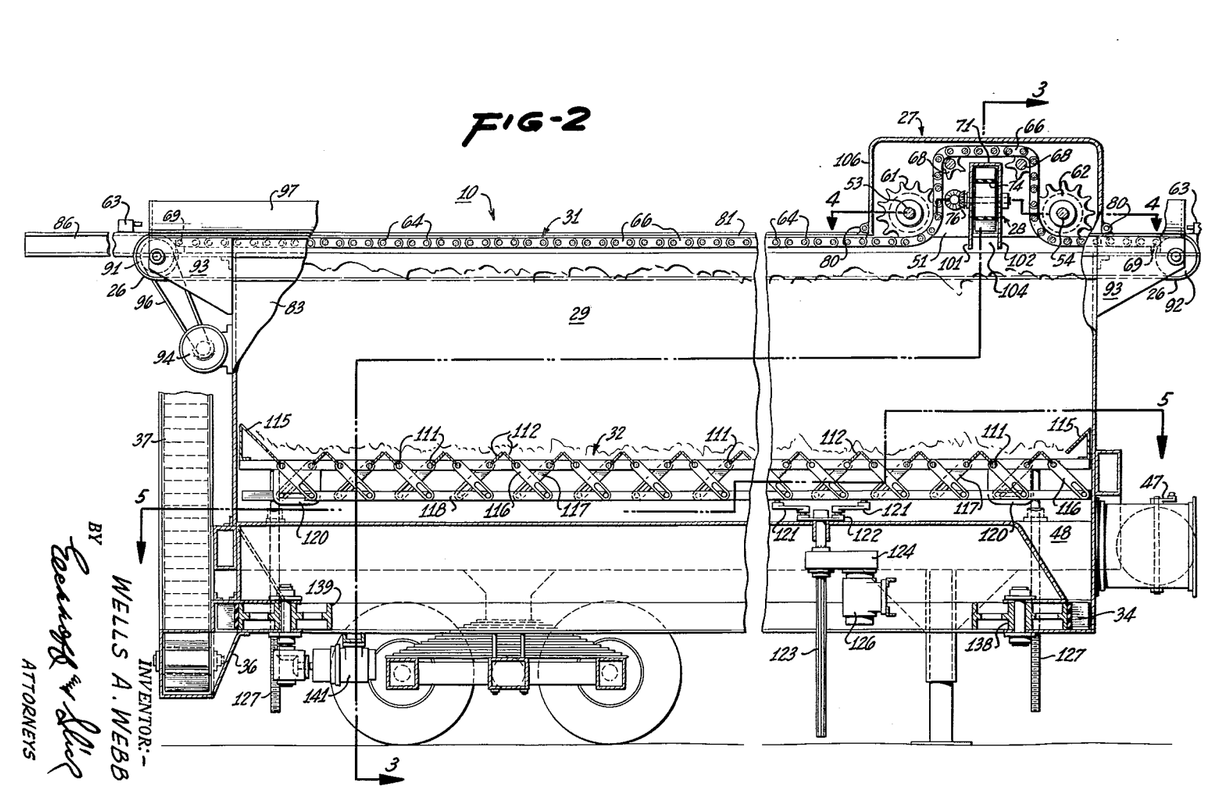
FIGURE 2 is a side elevation of the dehydrator apparatus, the view being partly in section.

When it is desired to move the distribution mechanism 27 to the left, as viewed in FIGURE 2, motor 59 rotates axle 53 and its attached sprockets 61 in a counterclockwise direction and conversely, reverse operation of motor 59 rotates axle 54 and sprockets 62 in a clockwise direction to propel mechanism 27 to the right. Limit switches 63 are provided at the maximum points of travel for reversing motor 59 and causing movement in the opposite direction. The distributor only feeds material when traveling in a direction opposite to that of the feed conveyor 26. When the two travel in the same direction, the distributor drive is cut off.

The flexible grid cover 31 (FIGURE 4) comprises a plurality of closely spaced parallel rods 64 fastened together toward their ends by line members 66 to form a chain-like assembly covering the upper portion of the compartment 29. Sleeve bearings 67 are mounted on the ends of each rod 64 to provide for engagement with a sliding lock bar 81 to hold the rods in place as will be explained in greater detail. As the distributor mechanism 27 moves toward the left, the rods 64 of assembly 31 are guided over sprockets 61 and over spaced idler sprockets 68 whereby the grid 31 is temporarily lifted from contact with the moist material to bypass transverse spreader unit 28 and so permit delivery of fresh material. The rods 64 are then guided down around sprockets 62 into normal material holding position. The links 66 at each end of the grid 31 are anchored as at 69 (FIGURE 2).

Figure 3:
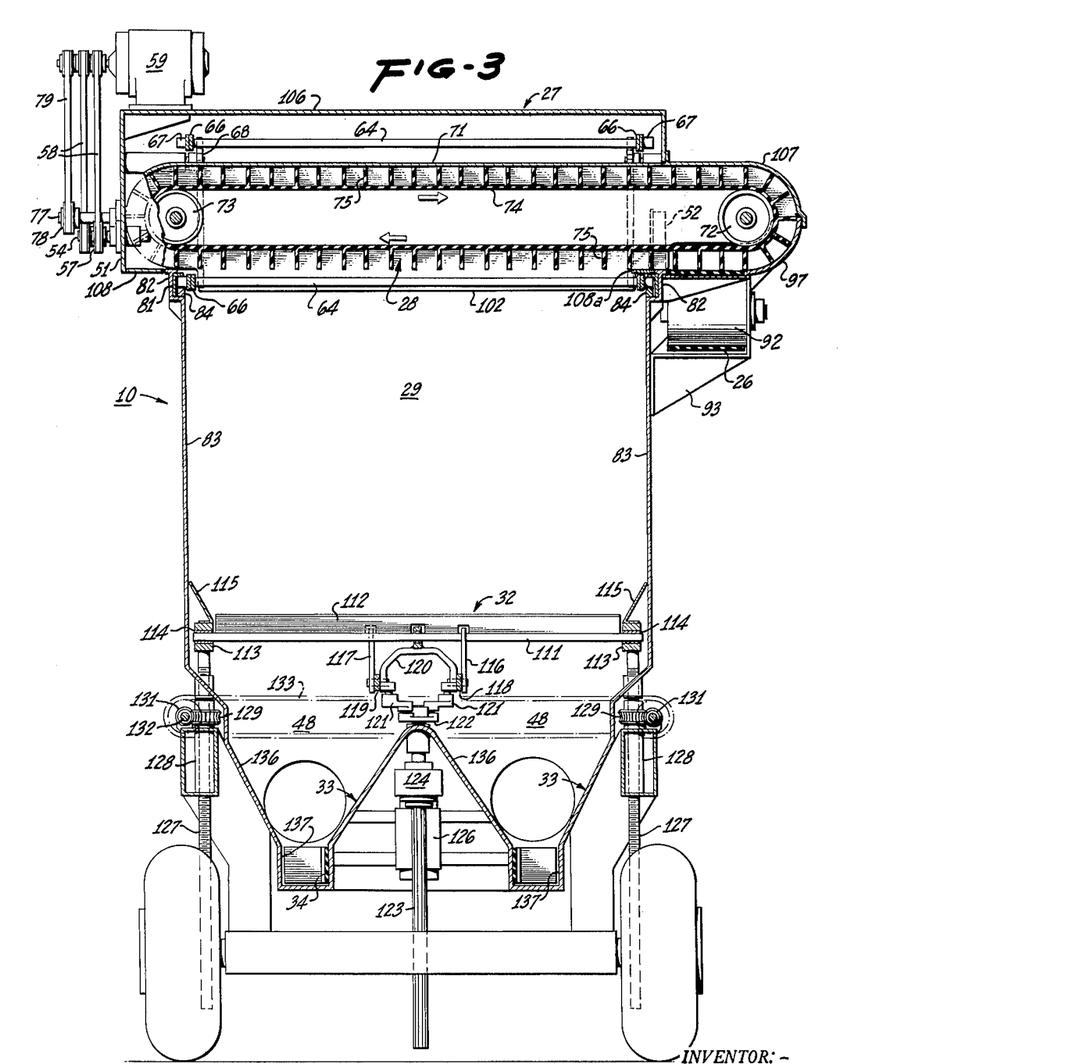
FIGURE 3 is a section on line 3—3 of FIGURE 2.
Figure 4:
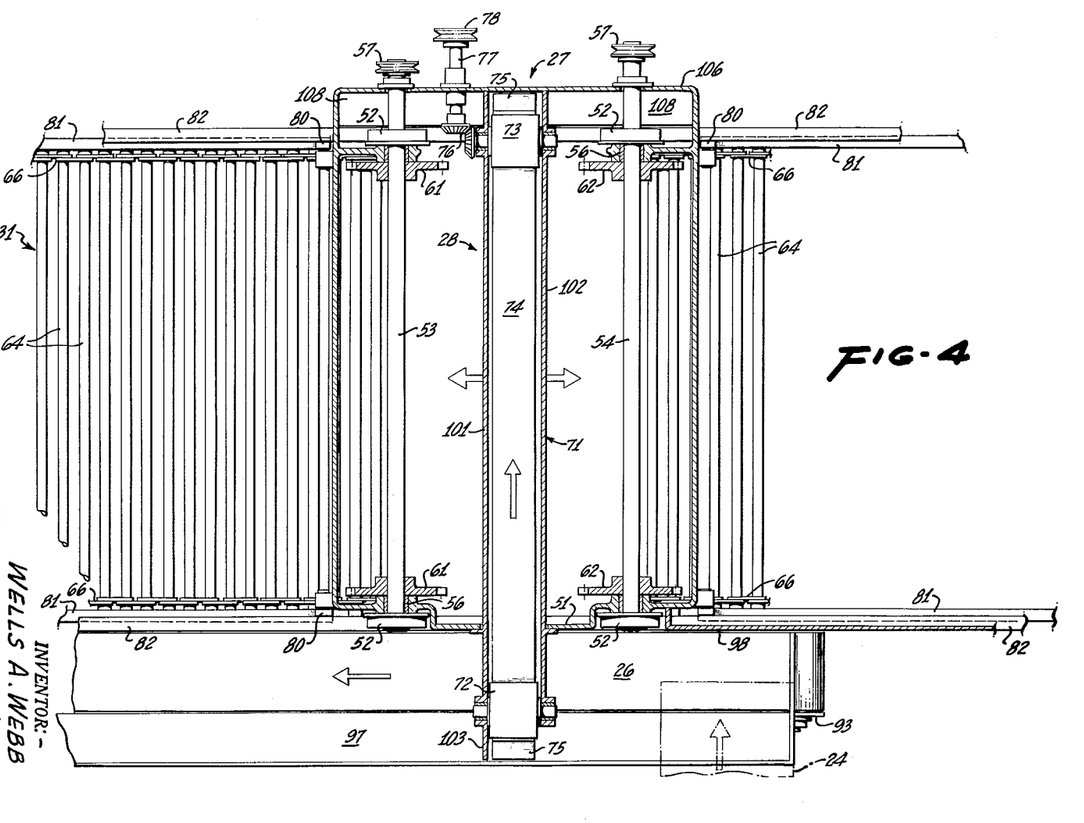
FIGURE 4 is a horizontal section of the spreader taken on line 4—4 of FIGURE 2.

The transverse spreader assembly 28 (FIGURE 3) of the distributing mechanism 27 comprises a housing 71 mounted on chassis 51 and having at opposite ends an idler pulley 72 and a drive pulley 73 carrying a conveyor belt 74 (FIGURES 3 and 4). Belt 74 is provided with a plurality of integral pusher elements 75 for spreading material from feed belt 26 across the width of the dehydrating compartment 29. Pulley 73 is driven by a bevel gear assembly 76 and drive shaft 77. A pulley 78 is affixed to the outer end of shaft 77 to provide for belt 79 from motor 59 (FIGURE 3).

Sliding lock bars 81 are fastened at 80 to each side of the distributor 27 (FIGURE 4) to retain the flexible grid 31 in a material confining position except at the location of the transverse spreader 28. The lock bars extend on each side of the distributor 27 and slide in the channels 82 as the distributor moves from one end of the drying chamber to the other. Supports 86 are provided 
at each end of the drying chamber (FIGURE 1) to support the lock bars as these move out from the chamber.

Figure 7:
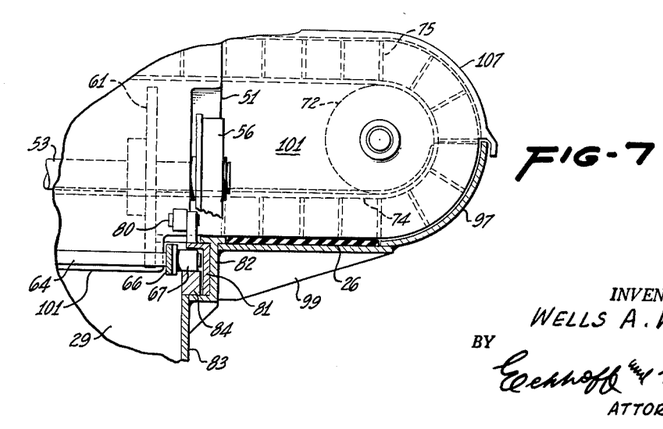
FIGURE 7 is a section of a detail illustrating the means of material transfer from the feed conveyor belt.

The flanged wheels 52 of distributor 27 are supported by the channels 82 which extend lengthwise along the top of side walls 83 of dehydrator compartment 29 as best seen in FIGURES 3 and 7. An elongated bearing bar element 84 is mounted on the lower flange of the tracks 82 to support the sleeves 67 on cross rods 64 and the lock bars 81.

The velocity of the air in the plenum chamber 48 is sufficiently high and turbulent to carry some particles of dry material upwardly. Generally, these will be caught and retained in the bed. The possibility of escape of the particles from the bed may occur due to shrinkage of the bed, crevices and fissures forming in the bed or between the bed and the walls 83. The increased velocity of air passing through such cracks and fissures leads to waste of dry suspended solids as well as of the dry air.

To avoid the loss of such particles, the several rods making up the flexible grid 31 are spaced sufficiently close together to retain any particles which might otherwise be blown from the chamber. Losses of dry air and dry material can be further prevented by stretching a flexible metallic screen over the grid 31 to catch the fine particles brought up from the plenum chamber, whereby these accumulate in the cracks and fissures, filling these so that, in effect, the mass undergoing drying exhibits a self-healing action which compensates for the formation of the cracks and fissures.

MATERIAL FEEDING AND DISTRIBUTION

Conveyor belt 26 is mounted on pulleys 91 and 92 (FIGURE 2), journalled on brackets 93 fastened to dehydrator unit 10. Motor 94 drives pulley 91 through belt 96. As best seen in FIGURE 4, feed conveyor belt 26 is guided between a stationary arcuate housing 97 and an inner vertical plate 98 (see FIGURE 4) extending horizontally from and attached to the distributor 27. The arcuate housing 97 and vertical plate 98 cooperate with belt 26 to form a trough for feeding material to the spreader 28. As shown in FIGURE 7, the arcuate housing 97 is supported by brackets 99 affixed to track 82 at the top of dehydrator side wall 83.

Transverse belt 74 scrapes the incoming material off conveyor belt 26 to spread it across the width of dehydrating compartment 29. For this purpose, housing 71 is provided with a pair of side walls 101 and 102 which extend downwardly around spreader belt 74. Wall 101 has an extension 103 which covers the area formed by arcuate housing 97 and belt 26 to prevent leakage of material past the transverse spreader. The bottom extremities of walls 101 and 102 extend below the level of belt 26 to form a reservoir 104 to hold any surplus material and drag this along over the mass in the dehydrator to fill any void.

The distributor 27 includes a hood 106 mounted over chassis 51 for preventing the upward flow of air through that portion of the grid 31 which is over the transverse spreader 28. The hood includes side and end walls and an arcuate housing 107 over the end of transverse belt 74 which mates with lower housing 97. Plates 108 are provided between track 82 and the hood walls to seal the bottom. Provision for the ingress of moist material from feed conveyor belt 26 to the interior of dehydrator compartment 29 is made through an air lock which prevents outflow of air. The air lock compartment comprises a plate **108*a* located adjacent to track 82, the depending side walls 101 and 102 of housing 71 and the belt 74. The spacing of paddle elements 75 on belt 74** is such that there is no loss of air during the feeding of moist material.

Thus the hood 106 together with housing 107 and plates 108 and **108*a* provides an effective plenum chamber of positive pressure above the dehydrator compartment and prevents the flow of air through the grid 31 in the area where the distributor mechanism 27** is located. This temporary stoppage of air flow through the moist material during the periodic passage of the distributor is beneficial to the formation of a uniform mass of material by allowing the leveling out of shrinkage voids and similar hollows by permitting the material to settle.

Heretofore it has not been possible to dry alfalfa and similar leafy food particles that shrink when in large beds, and form cracks when dried in large, deep beds, for the heated air rushes up through the cracks and through the openings between the bed and the side walls of the apparatus, and is lost; not effective in drying.

Cracks which tend to form in the bed are kept filled with dry, leafy, lightweight, relatively large size particles that are aerodynamically active and float in hot air and are carried upward in the cracks and are retained on the top screen, thereby stopping excessive uprush of air. Such particles accumulate in the cracks below the top screen to fill the cracks as rapidly as shrinkage of the bed permits cracks to form. Thereby the filled material in the cracks stops escape of drying air, and the hot air is forced to pass up through the bed, drying the food material.

As the bed descends during the drying process and the lower part is discharged, the particles of aerodynamically active material become loosened by grate action, and again are available to be suspended in upward moving heated air, filling cracks in the bed. Attrition of grate action breaking up leaves of alfalfa reduces aerodynamic capability, and the dry, broken leaves fall and are discharged from the plenum chamber.

The aerodynamically active material originates in the grinder or chopper of the wet food material, which produces a majority of coarse, heavyweight particles, plus sufficient lightweight aerodynamically active particle materials of large size to fill the cracks in the manner described.

This lightweight material is released when it reaches the grate, and its aerodynamic properties are such that a portion of it floats in the uprushing heated air, yet it is not all so fine that it passes the top screen, but its particle size is large enough to be retained on the top screen. Thus, this crack filling material is buoyant in the rising air. Thus, any leafy, lightweight flying particle can stop on the screen and fill up the cracks, preventing the wastage of the heated air.

The mesh of the top screen is small enough to retain the majority of the material that is carried upward through the cracks in the bed, and thereby the cracks are kept filled and hot air leaks stopped.

As an alternative method, designed to ensure that the aerodynamically active particles will be available to fill cracks that form near the location where the heated air enters the plenum chamber, a supply of dry, aerodynamically active particles may be fed into the hot air stream by introducing them into the conduit 45 and/or the conduits 46. This can be conveniently done by providing a star valve 45B, having a hopper 45C in conduit 45. This permits the particles to be introduced from a low pressure area into the high pressure area within the conduit. Another way of accomplishing this result is by reversing the direction of the discharge chain. From the point of introduction, aerodynamically active material is swept by the heated air, to be carried into cracks in the bed and fill the cracks, preventing waste of heated air.

TREATED MATERIAL REMOVAL

An oscillating grate 32 is provided, as previously mentioned, to support partially the material being treated and to allow regulated amounts of processed material to pass through to the discharge apparatus. The grate 32 (FIGURE 2) comprises a plurality of cross rods 111 having elongated strip-like cross bars 112 affixed thereto as by welding. Rods 111 are pivotally mounted as 114 on a pair of spaced parallel bars 113 having guide members 115 for contact with the walls of dehydrator compartment 29. Alternate rods 111 have affixed thereto depending lever arms 116 and 117 which are pivotally attached respectively to actuating bars 118 and 119 supported at their ends for a reciprocating motion by slotted brackets 120. A pair of connecting links 121 are provided between bars 118 and 119 and a double-ended lever 122 is mounted at the top of a splined drive shaft 123. Oscillating drive device 124 is provided between motor 126 and shaft 123 to change the rotary motion of motor 126 to the oscillating and reciprocating motion required for reciprocating drive bars 118 and 119. Since bars 118 and 119 are operated in opposite directions, lever arms 116 and 117 also swing toward and away from each other resulting in the oscillation of rods 111 over an arc of approximately 90°. As the cross bars 112 move through their arcuate paths, so that adjacent cross bars meet, some of the lower material adjacent the grate is trapped between the cross bars and is carried along by them. When the top extremities of two adjacent cross bars 112 meet, the air flow is effectively stopped in that specific area, whereupon the dried material between them falls into troughs 33. In this manner, the particulate material is periodically removed from the bottom of the chamber. The effect is not that of a fluidized bed wherein the material throughout the bed is in a constant state of agitation, but rather there is a constant movement downward through the bed of horizontal layers, with fresh material being added to the top of the bed, whereupon it descends in countercurrent flow to the rising air and is withdrawn from the bottom.

The vertical position of grate 32 may be adjusted as desired for varying depths of material by means of screw jack members 127 located generally adjacent the corners of the dehydrating compartment 29. Screw jacks 127 are attached to each end of grate supporting bars 113 and are positioned in vertical sleeve guide fittings 128 attached to the structure of the dehydrating apparatus 10. Internally threaded gear members 129 are provided on each screw jack 127 for vertical adjustment. Simultaneous actuation of the gears 129 to raise or lower the level of grate 32 is accomplished through mating worm gears 131 affixed to drive shafts 132 which are interconnected by chain and sprocket assembly 133.

Figure 5:
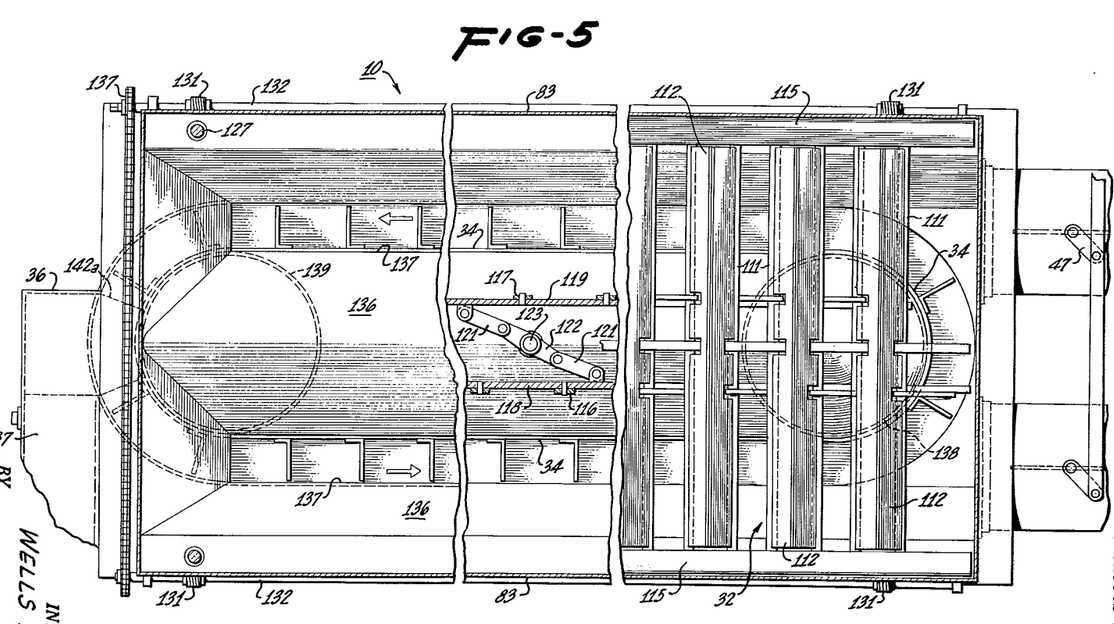
FIGURE 5 is a horizontal section of the dehydrator taken on the line 5—5 of FIGURE 2, illustrating the grate and discharge means.
Figure 6:
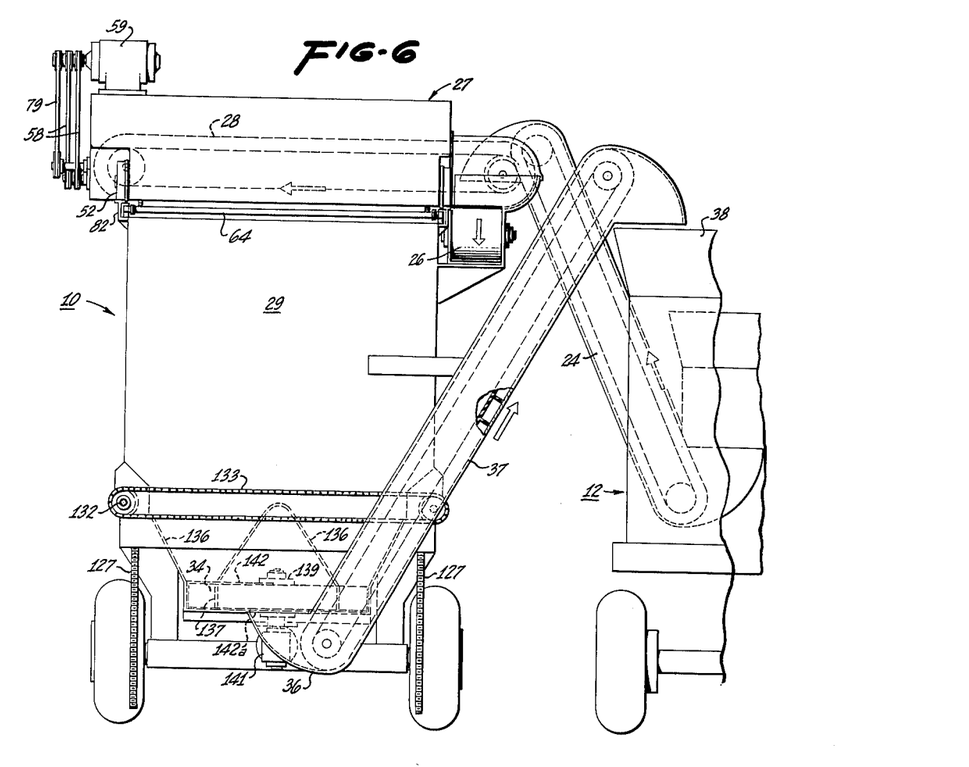
FIGURE 6 is an end elevation of the assembly showing the supply and discharge elevator-conveyors.

Dried material which falls into troughs 33 is guided by converging walls 136 into channels 137 for discharge as seen in FIGURES 3, 5 and 6. A conveyor 34, mounted on pulleys 138 and 139 and driven by motor 141, is operated in a channel 137 to carry the dried material through an air trap formed by the channel 137 and a cover plate 142 to a position over a discharge opening 142a in the bottom of channel 137 where it falls into hopper 36. An elevating conveyor 37 lifts the collected material from hopper 36 to a pelletizing apparatus 38 or directly to a packaging or filling apparatus 39 as desired for shipping.

OPERATION

The operation of the device will become further apparent from the following illustrative practices of the invention.

*Example 1*

Drying fresh onion slices.—The dryer was filled with fresh onion slices placed in chamber 29 to a depth of 16 inches. Air at 130° F. was blown upwardly through the chamber at 300 feet per minute. When countercurrent equilibrium was established, the slices were being fed at the rate of 30 pounds per hour per square foot of horizontal chamber area, and the yield of dried onion was established at approximately 4.8 pounds per square foot per hour. The air pressure was established at 5 inches of water level difference as read on a water manometer. The overall efficiency of the air pump and motor was 50%, and 0.037 k.w.hr. of energy was required to supply the air to dehydrate one pound of onion slices.

*Example 2*

Drying fresh garlic slices.—The dryer was filled with fresh garlic slices placed in the chamber 29 to a depth of 32 inches. Air at 120° F. was blown upwardly at 250 feet per minute. When a steady state had been established, the slices were being fed at the rate of 21 pounds per square foot of horizontal chamber area. The yield of dried garlic was 5 pounds per square foot per hour. The air pressure was established at 15 inches on the water manometer and 0.074 k.w.hr. of electrical energy was required per pound of dry yield.

It is noteworthy that the thermal efficiency of the countercurrent process is very high. In both examples above, the air was taken into the furnace at 75° F., and delivered at the outlet at 80° F. The following table gives comparative efficiencies:

Onion (Countercurrent) Efficiency =
$$\frac{(130-80)\times 100}{130-75}=91\%$$

Garlic (Countercurrent) Efficiency =
$$\frac{(120-80)\times 100}{120-75}=89\%$$

Onion (Tray dryer) Primary stage Efficiency =
$$\frac{(210-125)\times 100}{210-75}=63\%$$

Onion (Tray dryer) Secondary stage Efficiency =
$$\frac{(132-112)\times 100}{132-75}=35\%$$

It is also noteworthy that with the countercurrent method, I obtained a very high quality of product as determined by the optical density method. The dried onion had an optical density of 54 and the dried garlic an optical density of 98. The onion by tray drying had an optical density of 72, and the garlic by tray drying had an optical density of 96. The "optical density method" referred to immediately above is the standard method of analysis for suspensions or solutions of foods such as comminuted onion. According to this method, a solution which readily transmits white light is said to have a lower optical density than a solution or suspension which intercepts more white light and hence has a greater optical density. In a dehydration process, one desires to produce a product of lowest optical density, that is to say one which has been only very slightly darkened or colored by the drying operation.

These improved results can be attributed to the novel manner in which the products are treated in the drying chamber. By continuously varying the position of the cross bars 112 and the region in which the upwardly moving heated air is discharged into the suspended mass, the dry material is permitted to leave the drying chamber while the suspended particles above are constantly in a state of suspended agitation whereby they are quickly and uniformly dehydrated. Also, because of the dead space provided by moving the distributor over the top of the chamber, voids and shallow places are eliminated.

Owing to the high thermal efficiency and low labor cost, it is possible economically to utilize my invention for dehydrating distress crops for preparation of fodder. For this use, the removal of skins, husks, cobs, etc. is not necessary and many crop materials will yield from 24% to 28% of dehydrated product. Some examples are fruit products, including prunes, apricots, raisins, chopped cantaloupes; also chopped vegetable products, including green legumes, corn, potatoes and others. Green leafy products such as lettuce, alfalfa, beet tops, may be chopped and pressed to reduce water content to 75% and less. The pressed product is then dried.

Dehydration of such products for fodder may be accomplished as in the following example.

*Example 3*

A dehydrator 29 measuring 20 feet long, 4 feet wide and with an effective bed depth of 4 feet was utilized. Moist particles, containing approximately 25% solids and 75% moisture, were spread on the grate 32, which was gradually lowered while heated air was supplied to the bed at a temperature of 175°–200° F. A turbo-fan or resonant burner employed consumed 27 gallons of fuel oil to produce 4 million B.t.u. per hour. Exhaust gasses were mixed with fresh air and compressed, the pressure being increased as required to maintain the bed in partial suspension while additional moist material was added to the top of the bed. The losses in the heater-compressor unit amounted to about 5% so some 3.8 million B.t.u./hour were delivered to the bed with the compressed air.

As the depth of the bed was increased, the temperature of the discharged air rising out of the bed went down, and the thermal efficiency increased.

When the ambient air was at 75° F. and was heated to 175° F. and the discharge was at 105° F., the following thermal efficiency was attained:

$$\frac{175-105}{175-75} \times 100 = 70\%$$

Under these operating conditions, about 2.7 million B.t.u. were available for evaporation of moisture each hour. Experience has shown that about 1200 B.t.u. are required to remove each pound of moisture from the products named. Therefore, the dryer will remove about $$\frac{2,700,000}{1200} = 2250$$

pounds of water as vapor each hour.

At this rate of drying, 3270 pounds of fresh fruit containing 75% of moisture will be reduced to 1020 pounds of dry fruit containing 20% moisture. When a pressed vegetable product is fed, 3120 pounds of such particles containing 75% moisture will yield about 867 pounds of dry vegetable particles containing 10% moisture.

THE SOURCE OF HEATED AIR

I have previously mentioned that to supply the hot air I prefer to use an air-heater compressor unit indicated at 11 and I have mentioned the use of a gas turbine engine. There is a substantial advantage in the employment of such a device and particularly as one which operates in such a manner that sonic vibration is imparted to the material undergoing drying.

The evaporation of moisture from wet particles occurs when the heat is imparted to the particles from the surrounding atmosphere during a time interval in which the temperature of the particles themselves remains substantially unchanged. The principal barrier to such heat transfer is the boundary film of stagnant, saturated air that clings in a layer less than 0.01 inch on the solid surfaces of the wet particles. I have found that sonic vibration of the surrounding drying atmosphere aids in the transfer of heat across this boundary film and accelerates the rate of evaporation of moisture from the surfaces of the wet particles.

In the art of air-heating and compressing, it is customary to utilize several component units which operate in unison to deliver the desired stream of heated compressed air. A prime mover such as an electric motor or an internal combustion engine is utilized to drive a blower-compressor. The compressed air is then passed through a furnace where fuel is injected and burned in an amount sufficient to heat the air to the desired temperature by combustion of the fuel. In a unit of the size contemplated by the present invention, the prime mover, the compressor and the furnace must be of such a large size and heavy weight as to be practically incapable of mobility. By utilizing a gas turbine engine, I am able to provide a heater-compressor unit which can be readily moved about from place to place. In addition, such an engine does not provide the air in a continuous stream but as a vibrating stream. The net result is that the boundary film adjacent each particle is of very short duration and is constantly being changed, whereby much quicker drying is attained.

In place of a gas turbine one can employ a resonant burner. This device, as is well known, provides an exiting stream of hot dry combustion products having from about 60 to 600 pressure waves per second. The effect of the pressure is to disrupt the moisture boundary film and so effect quicker and more uniform drying. Suitable resonant burners are disclosed in Patents 2,543,758 and 2,857,332.

I claim:
1. A dehydration method comprising the steps of:
   (a) providing a dehydration zone;
   (b) passing a current of heated air upwardly through said zone;
   (c) spreading substantially horizontal layers of wet material across the top of said zone to provide stratified layers of material passing downwardly through the zone;
   (d) providing a grate structure at an initial elevation near the bottom of said zone moving said grate structure from said initial elevation to a position upwardly in the zone whereby at the start of the operation the zone has a relatively small height, and finally again moving said grate downwardly as more material is added to the top of the zone;
   (e) periodically closing said grate structure whereby portions of said zone are closed off and air flow is maintained around said closed off portions;
   (f) whereby material is trapped under said grate and falls to the bottom of said zone, and;
   (g) removing said material from the bottom of the zone.

2. The method of claim 1 wherein the rate of upward air flow in the zone is adjusted to support from 90% to 95% by weight of the material in the zone.

3. The method of claim 1 wherein the flow of air upwardly through the zone is interrupted in that portion of the zone where the wet material is spread.

4. In a dehydrating apparatus, means defining a drying chamber, means for supplying a current of warm dry gas at the bottom of the chamber to maintain wet material suspended in the chamber, a supporting grate located intermediate the top and bottom of said chamber, said supporting grate including means to periodically close selected areas of said grate preventing upward gas flow in said areas, said grate comprising a plurality of pairs of parallel, flat, strip-like cross bars extending across the chamber in side by side relationship, each of said cross bars having a free longitudinal extremity, the respective members of each pair of cross bars being arranged to pivot toward each other whereby the free extremities of the cross bars engage each other in sealing relationship substantially preventing the upward flow of gas between the said members of each pair of cross bars thereby permitting material under the thus sealed areas of the grate to fall to the bottom of the chamber.

5. The structure of claim 4 wherein said grate has means whereby it can be raised and lowered intermediate the top and bottom of the chamber.

6. A dehydration method comprising the steps of:
   (a) providing a dehydration zone;
   (b) passing a current of heated air upwardly through said zone;
   (c) spreading substantially horizontal layers of wet material across the top of said zone to substantially fill said zone with horizontally stratified layers of such particles, said particles moving slowly downwardly through said zone without substantial mixing or relative movement;

(d) drying said particles as the stratified layers move downwardly through the zone;
(e) removing any material from the bottom of said zone; and
(f) adding finely divided material to said current of heated air before said air current passes upwardly through said zone whereby cracks in the material being dehydrated are filled by said finely divided material.

References Cited by the Examiner
UNITED STATES PATENTS

| | | | |
|---|---|---|---|
| 2,668,041 | 2/1954 | Knibbs | 34—57 X |
| 2,813,351 | 11/1957 | Godel | 34—57 X |
| 3,047,473 | 7/1962 | Schmidt | 34—57 X |
| 3,093,450 | 6/1963 | Luerssen et al. | 34—10 X |

JOHN J. CAMBY, *Primary Examiner.*